(12) United States Patent
Liu et al.

(10) Patent No.: US 11,620,826 B2
(45) Date of Patent: Apr. 4, 2023

(54) PROCESSING APPARATUS, PROCESSING METHOD, AND NON-TRANSITORY STORAGE MEDIUM

(71) Applicant: NEC Corporation, Tokyo (JP)

(72) Inventors: Jianquan Liu, Tokyo (JP); Liting Zhou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 17/424,809

(22) PCT Filed: Jan. 25, 2019

(86) PCT No.: PCT/JP2019/002427
§ 371 (c)(1),
(2) Date: Jul. 21, 2021

(87) PCT Pub. No.: WO2020/152843
PCT Pub. Date: Jul. 30, 2020

(65) Prior Publication Data
US 2022/0084312 A1 Mar. 17, 2022

(51) Int. Cl.
*G06K 9/00* (2022.01)
*G06V 20/40* (2022.01)
*G06V 20/52* (2022.01)

(52) U.S. Cl.
CPC .............. *G06V 20/41* (2022.01); *G06V 20/44* (2022.01); *G06V 20/46* (2022.01); *G06V 20/52* (2022.01)

(58) Field of Classification Search
CPC ........ G06V 20/41; G06V 20/44; G06V 20/46; G06V 20/52; G06T 7/20
See application file for complete search history.

(56) References Cited

U.S. PATENT DOCUMENTS 9,132,352 B1 * 9/2015 Rabin ................... G06T 15/40
2008/0247601 A1 10/2008 Ito et al.
(Continued)

FOREIGN PATENT DOCUMENTS

JP 2008-252519 10/2008
JP 2017-028561 2/2017

OTHER PUBLICATIONS

International Search Report for PCT Application No. PCT/JP2019/002427, dated Apr. 23, 2019.
(Continued)

*Primary Examiner* — Dhaval V Patel
(74) *Attorney, Agent, or Firm* — Sughrue Mion, PLLC

(57) ABSTRACT

A processing apparatus (10) including: an event extraction unit (11) that extracts, for each image of a time-series image group, an event in which a person and an object relate to each other; an event information generation unit (12) that generates event information indicating a time-series change of a first event defined by a first person, a first object, and a first relationship between a person and an object and also indicating a time-series change of a second event defined by a second person, a second object, and a second relationship between a person and an object; a causal relationship computation unit (13) that computes a score indicating a causal relationship between the first event and the second event; and an output unit (14) that outputs information indicating the first event and the second event for which the score satisfies a predetermined condition.

9 Claims, 20 Drawing Sheets

(56) References Cited

U.S. PATENT DOCUMENTS

2017/0347068 A1* 11/2017 Kusumoto ....... G08B 13/19615
2018/0032817 A1* 2/2018 Loce ................ G08B 13/19613

OTHER PUBLICATIONS

Claudiu Tanase et al., "Semantic Sketch-Based Video Retrieval with Autocompletion", IUI '16 Companion: Companion Publication of the 21st International Conference on Intelligent User interfaces, Sonoma California USA, Mar. 7-10, 2016, pp. 97-101.

* cited by examiner (S ,V ,O )

S= MAN (ADULT),MAN (ELDERLY),MAN (CHILD),WOMAN (ADULT),
   WOMAN (ELDERLY),WOMAN (CHILD) ・・・

V= CARRY ・・・

O= BAG (BLACK),BAG (BROWN),BAG (WHITE) ・・・

RETRIEVAL CONDITION: A MAN(ADULT) HANDS A BAG(BLACK)
TO A WOMAN(ADULT)

FIRST EVENT: A MAN(ADULT) CARRIES A BAG(BLACK)
                       S1              V1           O1

SECOND EVENT: A WOMAN(ADULT) CARRIES A BAG(BLACK)
                          S2                  V2           O2

FIRST-EVENT-
RELEVANT STATE : 3

S1:MAN (ADULT) : 1
O1:BAG (BLACK) : 1
V1:CARRY : 1

FIRST-EVENT-
RELEVANT STATE : 1

S1:MAN (ADULT) : 1
O1:BAG (BLACK) : 0
V1:CARRY : 0

FIRST-EVENT-
RELEVANT STATE : 0

S1:MAN (ADULT) : 0
O1:BAG (BLACK) : 0
V1:CARRY : 0

SECOND-EVENT-
RELEVANT STATE : 3

S2:WOMAN (ADULT) : 1
O2:BAG (BLACK) : 1
V2:CARRY : 1

SECOND-EVENT-
RELEVANT STATE : 1

S2:WOMAN (ADULT) : 1
O2:BAG (BLACK) : 0
V2:CARRY : 0

SECOND-EVENT-
RELEVANT STATE : 0

S2:WOMAN (ADULT) : 0
O2:BAG (BLACK) : 0
V2:CARRY : 0

FIG. 7

$$HOI(\text{FIRST EVENT}) = (x_1, x_2, \cdots x_m)$$

$$HOJ(\text{SECOND EVENT}) = (y_1, y_2, \cdots y_m)$$

FIG. 8

HOI(FIRST EVENT) = (0,1,0,1,1,1,0,0,0,3,3,3,0,0)

HOI(SECOND EVENT) = (0,0,0,3,3,3,0,0,1,1,1,1,0,0)

FIG. 9

HOIC1(FIRST EVENT) = (0,1,0,1,1,1,0,0,0,0,0,0,0,0)

HOIC2(FIRST EVENT) = (0,0,0,0,0,0,0,0,0,3,3,3,0,0)

FIG. 10

HOIC1(SECOND EVENT) = (0,0,0,0,0,0,0,0,1,1,1,1,0,0)

HOIC2(SECOND EVENT) = (0,0,0,3,3,3,0,0,0,0,0,0,0,0)

FIRST-EVENT-
RELEVANT STATE : 3

S1:MAN (ADULT) : 1
O1:BAG (BLACK) : 1
V1:CARRY : 1

FIRST-EVENT-
RELEVANT STATE : 1

S1:MAN (ADULT) : 1
O1:BAG (BLACK) : 0
V1:CARRY : 0

FIRST-EVENT-
RELEVANT STATE : 0

S1:MAN (ADULT) : 0
O1:BAG (BLACK) : 0
V1:CARRY : 0

FIRST-EVENT-
RELEVANT STATE : 2

S1:MAN (ADULT) : 0
O1:BAG (BLACK) : 1
V1:CARRY : 1

SECOND-EVENT-
RELEVANT STATE : 3

S2: WOMAN (ADULT) : 1
O2: BAG (BLACK) : 1
V2: CARRY : 1

SECOND-EVENT-
RELEVANT STATE : 1

S2: WOMAN (ADULT) : 1
O2: BAG (BLACK) : 0
V2: CARRY : 0

SECOND-EVENT-
RELEVANT STATE : 0

S2: WOMAN (ADULT) : 0
O2: BAG (BLACK) : 0
V2: CARRY : 0

SECOND-EVENT-
RELEVANT STATE : 2

S2: WOMAN (ADULT) : 0
O2: BAG (BLACK) : 1
V2: CARRY : 1

PROCESSING APPARATUS, PROCESSING METHOD, AND NON-TRANSITORY STORAGE MEDIUM

This application is a National Stage Entry of PCT/JP2019/002427 filed on Jan. 25, 2019, the contents of all of which are incorporated herein by reference, in their entirety.

TECHNICAL FIELD

The present invention relates to a processing apparatus, a processing method, and a program.

BACKGROUND ART

NPL 1 discloses a technique for video retrieval based on a handwritten image. In the technique, upon accepting an input of a handwritten image in an input field, a scene similar to the handwritten image is retrieved and output.

RELATED DOCUMENT

Non Patent Document

[NPL 1] Claudiu Tanase, and seven others, "Semantic Sketch-Based Video Retrieval with Auto completion", [Online], [searched on Sep. 5, 2017], Internet <URL: https://iui.ku.edu.tr/sezgin_publications/2016/Sezgin-IUI-2016.pdf>

DISCLOSURE OF THE INVENTION

Technical Problem

A technique for analyzing a video and detecting occurrence of an incident defined by a plurality of objects (persons and objects), such as "a first person hands a first object to a second person" is desired. In particular, a technique for detecting occurrence of an incident to be detected by means of an image analysis, when an object (a person or an object) involved in the incident is present within an image, whereas a scene in which the incident occurs (example: a scene of handing an object) is absent within the image, is desired. NPL 1 discloses no means for solving the problem.

The present invention aims to enable detection of occurrence of an incident to be detected by means of an image analysis, even when a scene in which the incident occurs is absent within an image.

Solution to Problem

According to the present invention, a processing apparatus including:

an event extraction means for extracting, for each image of a time-series image group, an event in which a person and an object relate to each other;

an event information generation means for generating event information indicating a time-series change of a first event defined by a first person, a first object, and a first relationship between a person and an object and also indicating a time-series change of a second event defined by a second person, a second object, and a second relationship between a person and an object;

a causal relationship computation means for computing, based on the event information, a score indicating a causal relationship between the first event and the second event; and an output means for outputting information indicating the first event and the second event for which the score satisfies a predetermined condition, from among the first events and the second events extracted from the time-series image group is provided.

Further, according to the present invention, a processing method executed by a computer, the method including:

an event extraction step of extracting, for each image of a time-series image group, an event in which a person and an object relate to each other;

an event information generation step of generating event information indicating a time-series change of a first event defined by a first person, a first object, and a first relationship between a person and an object and also indicating a time-series change of a second event defined by a second person, a second object, and a second relationship between a person and an object;

a causal relationship computation step of computing, based on the event information, a score indicating a causal relationship between the first event and the second event; and an output step of outputting information indicating the first event and the second event for which the score satisfies a predetermined condition, from among the first events and the second events extracted from the time-series image group is provided.

Further, according to the present invention, a program causing a computer to function as:

an event extraction means for extracting, for each image of a time-series image group, an event in which a person and an object relate to each other;

an event information generation means for generating event information indicating a time-series change of a first event defined by a first person, a first object, and a first relationship between a person and an object and also indicating a time-series change of a second event defined by a second person, a second object, and a second relationship between a person and an object;

a causal relationship computation means for computing, based on the event information, a score indicating a causal relationship between the first event and the second event; and an output means for outputting information indicating the first event and the second event for which the score satisfies a predetermined condition, from among the first events and the second events extracted from the time-series image group is provided.

Advantageous Effects of Invention

According to the present invention, even when a scene in which an incident to be detected occurs (example: a scene of handing an object) is absent within an image, occurrence of the incident can be detected by means of an image analysis.

BRIEF DESCRIPTION OF THE DRAWINGS

The above-described object and other objects, features, and advantageous effects become more apparent from the preferred example embodiments described below and the following accompanying drawings.

FIG. 7 is a diagram illustrating one example of event information.

FIG. 8 is a diagram illustrating event information by using a specific value.

FIG. 9 is a diagram illustrating event information generated from image data generated by a first camera.

FIG. 10 is a diagram illustrating event information generated from image data generated by a second camera.

Figure 11:
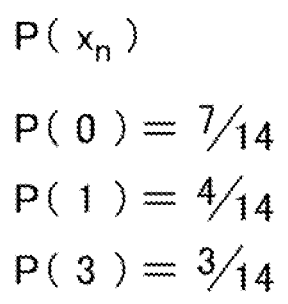

FIG. 11 is a diagram illustrating an example of a specifically computed probability for use in computation of a score.

Figure 12:
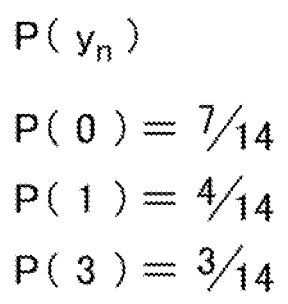

FIG. 12 is a diagram illustrating an example of a specifically computed probability for use in computation of a score.

FIG. 13 is a diagram illustrating an example of a specifically computed probability for use in computation of a score.

FIG. 14 is a diagram illustrating an example of a specifically computed probability for use in computation of a score.

FIG. 15 is a diagram illustrating an example of a specifically computed probability for use in computation of a score.

FIG. 16 is a diagram illustrating an example of a specifically computed probability for use in computation of a score.

FIG. 17 is a diagram illustrating an example of a specifically computed probability for use in computation of a score.

DESCRIPTION OF EMBODIMENTS

First Example Embodiment

First, an overview of a processing apparatus according to the present example embodiment will be described. First, the processing apparatus extracts, for each image of a time-series image group, an event in which a person and an object relate to each other. Examples of an event to be extracted are, but not limited to, "a man (adult) carries a bag (black)", "a woman (adult) carries a bag (black)", "a man (child) carries a ball (red)", and the like.

Then, the processing apparatus extracts, from the extracted events, a plurality of events involved in an incident to be detected. The incident to be detected is an incident defined by a plurality of objects (persons and objects), and examples thereof are, for example, "a man (adult) hands a bag (black) to a woman (adult)" and the like. When an incident to be detected is the above example, a plurality of events involved in the incident to be detected are "a man (adult) carries a bag (black)", "a woman (adult) carries a bag (black)", and the like.

Then, the processing apparatus computes a score indicating a causal relationship between the "plurality of events" being extracted. Then, the processing apparatus outputs a combination of a plurality of events for which the score satisfies a predetermined condition, from among the events extracted from the image.

In this way, the processing apparatus can detect a combination of a plurality of events involved in an incident to be detected and being in a causal relationship greater than a reference level. Thus, even when a scene in which an incident to be detected occurs is absent within an image, occurrence of the incident can be detected by means of an image analysis.

Next, a configuration of the processing apparatus according to the present example embodiment will be described in detail. First, one example of a hardware configuration of the processing apparatus will be described. Each function unit included in the processing apparatus according to the present example embodiment is achieved by any combination of hardware and software, mainly by a central processing unit (CPU) of any computer, a memory, a program loaded on a memory, a storage unit such as a hard disk that stores the program (that can store not only a program stored in advance at a stage of shipping an apparatus, but also a program downloaded from a storage medium such as a compact disc (CD), a server on the Internet, and the like), and an interface for network connection. Then, it will be understood by those skilled in the art that various modification examples can be made in a method and an apparatus for achieving the processing apparatus.

Figure 1:
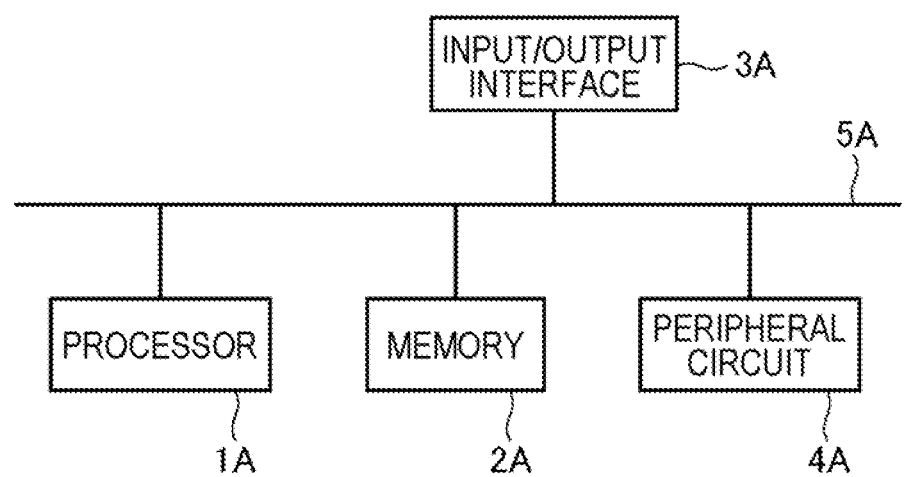
FIG. 1 is a diagram illustrating one example of a hardware configuration of a processing apparatus according to the present example embodiment.

FIG. 1 is a block diagram illustrating a hardware configuration of the processing apparatus according to the present example embodiment. As illustrated in FIG. 1, the processing apparatus includes a processor 1A, a memory 2A, an input/output interface 3A, a peripheral circuit 4A, and a bus 5A. The peripheral circuit 4A includes various modules. The processing apparatus may not include the peripheral circuit 4A. Note that, the processing apparatus may be configured by a plurality of physically and/or logically separated apparatuses. In this case, each of a plurality of apparatuses can include the above-described hardware configuration.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU and a graphics processing unit (GPU). The memory 2A is a memory such as, for example, a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, and the like. The output apparatus is, for example, a display, a speaker, a printer, a mailer, and the like. The processor 1A can issue an instruction to each module, and can perform an arithmetic operation, based on an arithmetic operation result thereof.

Figure 2:
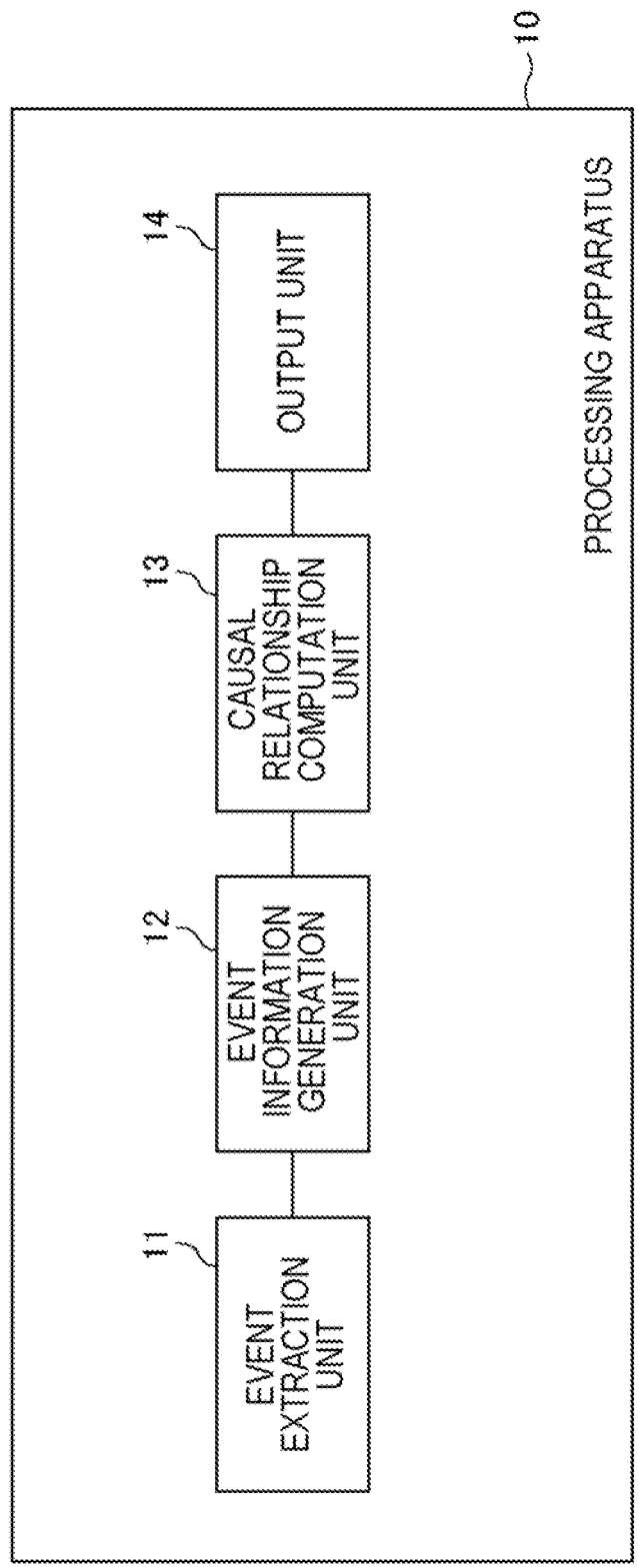
FIG. 2 is one example of a function block diagram of the processing apparatus according to the present example embodiment.

Next, one example of a function configuration of the processing apparatus will be described. As illustrated in a function block diagram in FIG. 2, a processing apparatus 10 includes an event extraction unit 11, an event information generation unit 12, a causal relationship computation unit 13, and an output unit 14.

The event extraction unit 11 extracts, for each image of a time-series image group, an event in which a person and an object relate to each other. A time-series image group to be processed may be all frame images included in video data generated by a camera, or may be frame images picked up from the video data at predetermined intervals (example: every few seconds, every few frames).

Further, the event extraction unit 11 can execute the above-described processing of extracting an event, regarding, as a processing target, a time-series image group included in a plurality of pieces of video data generated by each of a plurality of cameras.

Examples of an event to be extracted are, but not limited to, "a man (adult) carries a bag (black)", "a woman (adult) carries a bag (black)", "a man (child) carries a ball (red)", and the like.

Figure 3:
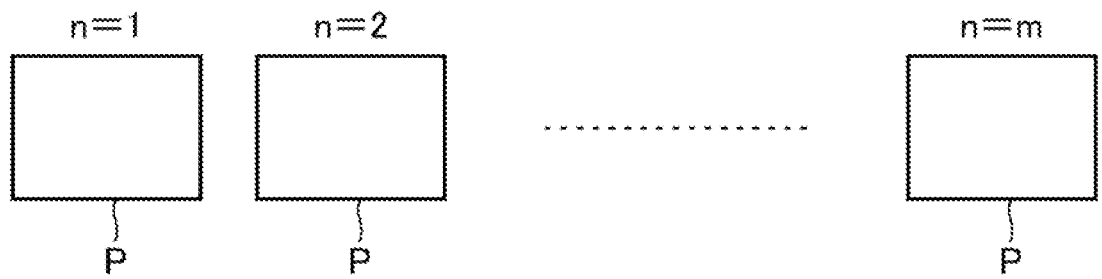
FIG. 3 is a diagram for illustrating one example of processing of extracting an event.

A specific example of extraction processing performed by the event extraction unit 11 will be described by using FIG. 3. P illustrated in the drawing is an image included in a time-series image group, and m images are illustrated in the drawing. Note that, the number of m is a design variation. n is a serial number for identifying each image.

For example, as illustrated in the drawing, a "person", an "object", and a "relationship between a person and an object" to be extracted may be defined in advance. S illustrated in the drawing is a person to be extracted, O is an object to be extracted, and V is a relationship between a person and an object to be extracted.

An event in which a person and an object relate to each other can be represented by, for example, a combination of three values (S, V, O), as illustrated in in the drawing. (S, V, O)=(man (adult), carry, bag (black)) represents an event that "a man (adult) carries a bag (black)".

The event extraction unit 11 can achieve the above-described extraction by using various techniques. For example, an appearance feature of each person, each object, and each relationship between a person and an object to be extracted may be registered in advance, and the event extraction unit 11 may achieve the above-described extraction by retrieving the feature within an image by means of an image analysis. Besides the above, the event extraction unit 11 may achieve the above-described extraction by using a machine learning technique such as a residual network (resnet) and a long short term memory (LSTM).

Returning to FIG. 2, the event information generation unit 12 generates event information indicating a time-series change of a first event defined by a first person, a first object, and a first relationship between a person and an object and also indicating a time-series change of a second event defined by a second person, a second object, and a second relationship between a person and an object.

In order to generate event information, first, the event information generation unit 12 determines the first event (S1, V1, O1) and the second event (S2, V2, O2).

As one example, an operator may perform, on the processing apparatus 10, an input of directly specifying S1, V1, O1, S2, V2, and O2. When desiring to determine the first event as "a man (adult) carries a bag (black)", an operator is supposed to perform an input of specifying "man (adult)" as S1, specifying "carry" as V1, and specifying "bag (black)" as O1.

Figure 4:
FIG. 4 is a diagram for illustrating one example of processing of determining a first event and a second event.

As another example, an operator may perform, on the processing apparatus 10, an input of specifying an incident desired to be detected. For example, an operator may input, to the processing apparatus 10, a sentence such as "an adult man hands a black bag to an adult woman". In a case of the example, the event information generation unit 12 performs a syntactic analysis or the like of the sentence, and extracts a noun for S1, S2, O1, and O2 from the sentence. Further, the event information generation unit 12 extracts a verb from the sentence, and determines V1 and V2, based on the extracted verb and a transformation rule for transforming the extracted verb into V1 and V2. FIG. 4 illustrates a conceptual diagram of the processing.

In this way, based on a specified retrieval condition, the event information generation unit 12 can determine the first event for which the first person (S1), the first object (O1), and the first relationship (V1) are specified, and can also determine the second event for which the second person (S2), the second object (O2), and the second relationship (V2) are specified. The specified retrieval condition is a retrieval condition directly specifying S1, V1, O1, S2, V2, and O2, a retrieval condition specifying an incident desired to be detected, and the like.

After determining the first event and the second event in a way, for example, as described above, the event information generation unit 12 generates event information indicating a time-series change of the first event and also indicating a time-series change of the second event.

Specifically, the event information generation unit 12 defines a plurality of first-event-relevant states relevant to the first event, in response to whether each of the first person, the first object, and the first relationship is included in an image. Then, the event information generation unit 12 classifies each image into any of the plurality of first-event-relevant states, and generates event information indicating a time-series change of the first-event-relevant state.

Figure 5:
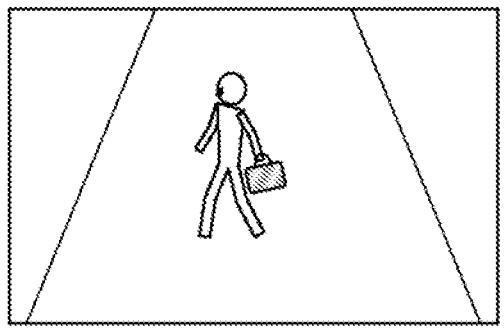
FIG. 5 is a diagram for illustrating one example of a plurality of first-event-relevant states.
Figure 5:
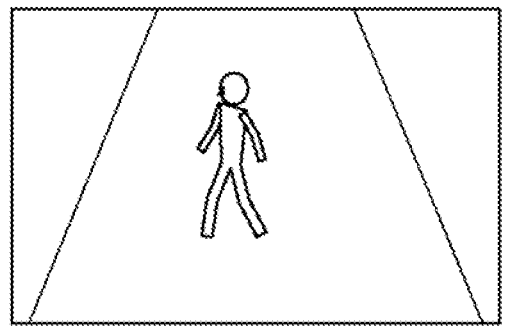
Figure 5:
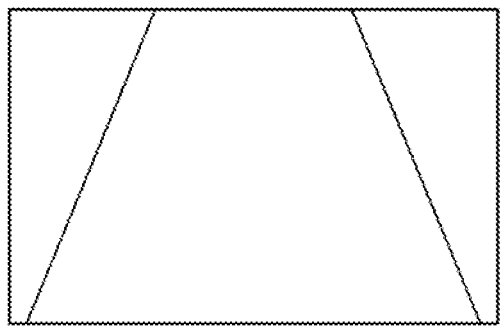

One example of how a plurality of first-event-relevant states are defined will be described by using FIG. 5. In an example illustrated in the drawing, three first-event-relevant states are defined.

A "first-event-relevant state: 3" is a state in which all of the first person (S1: man (adult)), the first object (O1: bag (black)), and the first relationship (V1: carry) are included in an image. In other words, the "first-event-relevant state: 3" is a state in which the first event defined by S1, V1, and O1 is occurring.

A "first-event-relevant state: 1" is a state in which the first person (S1: man (adult)) is included in an image, whereas the first object (O1: bag (black)) and the first relationship (V1: carry) are not included in the image. In other words, the "first-event-relevant state: 1" is a state in which the first event defined by S1, V1, and O1 is not occurring, whereas the first person involved in the first event is present in an image.

A "first-event-relevant state: 0" is a state in which all of the first person (S1: man (adult)), the first object (O1: bag (black)), and the first relationship (V1: carry) are not included in an image. In other words, the "first-event-relevant state: 0" is a state in which the first event defined by S1, V1, and O1 is not occurring, and the first person involved in the first event is absent in an image.

Note that, all images not pertaining to either of the "first-event-relevant state: 3" and the "first-event-relevant state: 1" may be classified into the "first-event-relevant state: 0".

Similarly, the event information generation unit 12 defines a plurality of second-event-relevant states relevant to the second event, in response to whether each of the second person, the second object, and the second relationship is included in an image. Then, the event information generation unit 12 classifies each image into any of the plurality of second-event-relevant states, and generates event information indicating a time-series change of the second-event-relevant state.

Figure 6:
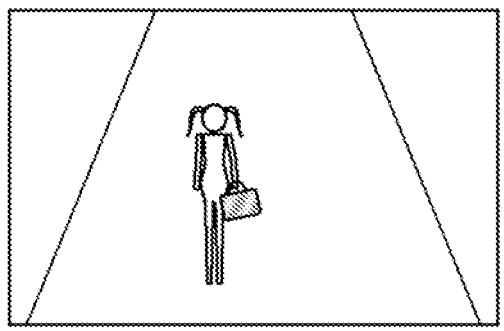
FIG. 6 is a diagram for illustrating one example of a plurality of second-event-relevant states.
Figure 6:
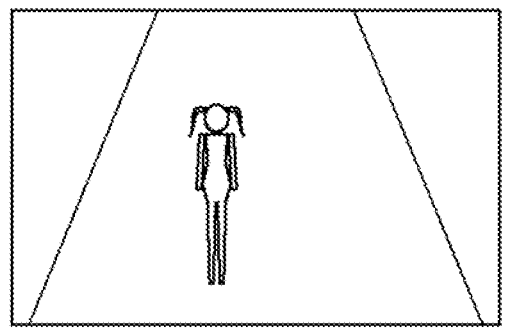
Figure 6:
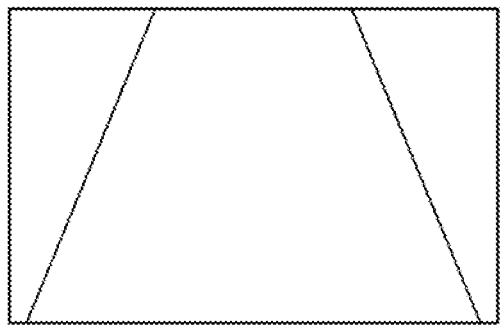

One example of how a plurality of second-event-relevant states are defined will be described by using FIG. 6. In an example illustrated in the drawing, three second-event-relevant states are defined.

A "second-event-relevant state: 3" is a state in which all of the second person (S2: woman (adult)), the second object (O2: bag (black)), and the second relationship (V2: carry) are included in an image. In other words, the "second-event-relevant state: 3" is a state in which the second event defined by S2, V2, and O2 is occurring.

A "second-event-relevant state: 1" is a state in which the second person (S2: woman (adult)) is included in an image, whereas the second object (O2: bag (black)) and the second relationship (V2: carry) are not included in the image. In other words, the "second-event-relevant state: 1" is a state in which the second event defined by S2, V2, and O2 is not occurring, whereas the second person involved in the second event is present in an image.

A "second-event-relevant state: 0" is a state in which all of the second person (S2: woman (adult)), the second object (O2: bag (black)), and the second relationship (V2: carry) are not included in an image. In other words, the "second-event-relevant state: 0" is a state in which the second event defined by S2, V2, and O2 is not occurring, and the second person involved in the second event is absent in an image.

Note that, all images not pertaining to either of the "second-event-relevant state: 3" and the "second-event-relevant state: 1" may be classified into the "second-event-relevant state: 0".

Event information indicating a time-series change of the first-event-relevant state and a time-series change of the second-event-relevant state can be represented as in, for example, FIG. 7.

HOI(first event) is event information indicating a time-series change of the first-event-relevant state. In an example illustrated in the drawing, m of values of $x_n$ are arranged in time-series order. $x_n$ indicates into which of the first-event-relevant states an n-th image is classified. In a case of the example described by using FIG. 5, $x_n$ takes any value of 0, 1, and 3.

HOJ(second event) is event information indicating a time-series change of the second-event-relevant state. In an example illustrated in the drawing, m of values of $y_n$ are arranged in time-series order. $y_n$ indicates into which of the second-event-relevant states an n-th image is classified. In a case of the example described by using FIG. 6, $y_n$ takes any value of 0, 1, and 3.

FIG. 8 illustrates a specific example of event information in which $x_n$ and $y_n$ are assigned with a specific value. In a case of the example illustrated in the drawing, a time-series change of the first event and the second event for fourteen time-series images is indicated. Referring to FIGS. 7 and 8 by comparison, it can be seen that $x_1$ indicating the first-event-relevant state of an image being n=1 is 0 and $y_1$ indicating the second-event-relevant state is 0. Further, it can be seen that $x_2$ indicating the first-event-relevant state of an image being n=2 is 1 and $y_2$ indicating the second-event-relevant state is 0.

The number of time-series images for which event information indicates a time-series change of the first event and the second event, that is, a value of m is a design variation. However, m time-series images are determined preferably in such a way as to include a timing at which the first event is occurring (a timing at which the first-event-relevant state is 3) and a timing at which the second event is occurring (a timing at which the second-event-relevant state is 3). The event information generation unit 12 may generate a plurality of pieces of event information indicating a time-series change of the first event and the second event for m time-series images, from a time-series image group including q images (m≤q). The plurality of pieces of event information may indicate a time-series change of the first event and the second event for a group of m images cut out at mutually different timings. Further, the plurality of pieces of event information may indicate a time-series change of the first event and the second event for groups having mutually different numbers of images (image groups having mutually different numbers of m).

Note that, the event information generation unit 12 may generate, by using the above-described approach, event information for each time-series image group included in a plurality of pieces of video data generated by a plurality of cameras, and may time-synchronously integrate pieces of the event information generated in association with each camera to generate final event information.

The processing will be described in detail by using FIGS. 9 and 10. HOIC1(first event) illustrated in FIG. 9 is event information relating to the first event and generated by using the above-described approach, based on a time-series image group included in video data generated by a first camera. HOIC2(first event) is event information relating to the first event and generated by using the above-described approach, based on a time-series image group included in video data generated by a second camera. When two pieces of the event information are subjected to a logical operation (integration) in accordance with a predetermined rule, HOI(first event) illustrated in FIG. 8 is acquired.

Similarly, HOIC1(second event) illustrated in FIG. 10 is event information relating to the second event and generated by using the above-described approach, based on a time-series image group included in video data generated by a first camera. HOIC2(second event) is event information relating to the second event and generated by using the above-described approach, based on a time-series image group included in video data generated by a second camera. When two pieces of the event information are subjected to a logical operation (integration) in accordance with a predetermined rule, HOI(second event) illustrated in FIG. 8 is acquired.

The predetermined rule is a rule for determining one output value from two input values. There are two types of input values: "0" and a "value different from 0". The "value different from 0" can take a plurality of values. The output value is either value of the two input values. When at least one of the two input values is a "value different from 0", the output value is the "value different from 0". When both of the two input values are "0", the output value is "0".

Returning to FIG. 2, the causal relationship computation unit 13 computes, based on the event information generated by the event information generation unit 12, a score indicating a causal relationship between the first event and the second event.

Specifically, the causal relationship computation unit 13 computes, as the above-described score, a probability $T_{J \to I}$ that the first event occurs due to the second event, based on an equation (1) below.

[Mathematical 1]

$$T_{J \to I} = \sum_{x_{n+1}, x_n, y_n} p(x_{n+1}, x_n, y_n) \log\left(\frac{p(x_{n+1}, x_n, y_n) \cdot p(x_n)}{p(x_n, y_n) \cdot p(x_{n+1}, x_n)}\right) \quad \text{Equation (1)}$$

Further, the causal relationship computation unit 13 computes, as the above-described score, a probability $T_{I \to J}$ that the second event occurs due to the first event, based on an equation (2) below.

[Mathematical 2]

$$T_{I \to J} = \sum_{y_{n+1}, x_n, y_n} p(y_{n+1}, x_n, y_n) \log \left( \frac{p(y_{n+1}, x_n, y_n) \cdot p(y_n)}{p(x_n, y_n) \cdot p(y_{n+1}, y_n)} \right) \quad \text{Equation (2)}$$

$p(x_n)$ indicates a probability that the first-event-relevant state indicated as $x_n$ appears, in an image group for which a time-series change of the first-event-relevant state and the second-event-relevant state is indicated by event information.

$p(y_n)$ indicates a probability that the second-event-relevant state indicated as $y_n$ appears, in an image group for which a time-series change of the first-event-relevant state and the second-event-relevant state is indicated by event information.

$p(x_n, y_n)$ indicates a probability that the first-event-relevant state indicated as $x_n$ and the second-event-relevant state indicated as $y_n$ concurrently appear, in an image group for which a time-series change of the first-event-relevant state and the second-event-relevant state is indicated by event information.

$p(x_{n+1}, x_n)$ indicates a probability that the first-event-relevant state indicated as $x_{n+1}$ occurs immediately after the first-event-relevant state indicated as $x_n$ occurs, in an image group for which a time-series change of the first-event-relevant state and the second-event-relevant state is indicated by event information.

$p(y_{n+1}, y_n)$ indicates a probability that the second-event-relevant state indicated as $y_{n+1}$ occurs immediately after the second-event-relevant state indicated as $y_n$ occurs, in an image group for which a time-series change of the first-event-relevant state and the second-event-relevant state is indicated by event information.

$p(x_{n+1}, x_n, y_n)$ indicates a probability that the first-event-relevant state indicated as $x_{n+1}$ occurs immediately after the first-event-relevant state indicated as $x_n$ and the second-event-relevant state indicated as $y_n$ concurrently occur, in an image group for which a time-series change of the first-event-relevant state and the second-event-relevant state is indicated by event information.

$p(y_{n+1}, x_n, y_n)$ indicates a probability that the second-event-relevant state indicated as $y_{n+1}$ occurs immediately after the first-event-relevant state indicated as $x_n$ and the second-event-relevant state indicated as $y_n$ concurrently occur, in an image group for which a time-series change of the first-event-relevant state and the second-event-relevant state is indicated by event information.

When the event information generated by the event information generation unit 12 is as illustrated in FIG. 8, each of the above-described probabilities is computed as in FIGS. 11 to 17. Herein, a method of computing a probability will be described by using an example of $p(x_n)$ illustrated in FIG. 11. As described above, $x_n$ takes any value of 0, 1, and 3. According to FIGS. 7 and 8, the number of $x_n$'s taking 0 is seven, the number of $x_n$'s taking 1 is four, and the number of $x_n$'s taking 3 is three. Therefore, p(0)=7/(7+4+3)=7/14. Similarly, p(1)=4/14, and p(3)=3/14.

Next, based on examples in FIGS. 11 to 17, a value substituted for the equation (1) when n=1 will be described.

First, a value $p(x_1)$ substituted for $p(x_n)$ when n=1 will be described. According to FIGS. 7 and 8, since $x_1=0$, $p(x_1)=p(0)$. Then, according to FIG. 11, in a case of $p(x_n)$, p(0)=7/14. Therefore, a value $p(x_1)$ substituted for $p(x_n)$ when n=1 is 7/14.

Next, a value $p(x_1, y_1)$ substituted for $p(x_n, y_n)$ when n=1 will be described. According to FIGS. 7 and 8, since $x_1=y_1=0$, $p(x_1,y_1)=p(0,0)$. Then, according to FIG. 13, in a case of $p(x_n,y_n)$, p(0,0) is 6/14. Therefore, a value $p(x_1,y_1)$ substituted for $p(x_n,y_n)$ when n=1 is 6/14.

Next, a value $p(x_2, x_1)$ substituted for $p(x_{n+1}, x_n)$ when n=1 will be described. According to FIGS. 7 and 8, since $x_1=0$ and $x_2=1$, $p(x_2, x_1)=p(1,0)$. Then, according to FIG. 14, in a case of $p(x_{n+1}, x_n)$, p(1,0) is 2/13. Therefore, a value substituted for $p(x_{n+1}, x_n)$ when n=1 is 2/13.

Next, a value $p(x_2, x_1, y_1)$ substituted for $p(x_{n+1}, x_n, y_n)$ when n=1 will be described. According to FIGS. 7 and 8, since $x_1=y_1=0$ and $x_2=1$, $p(x_2, x_1, y_1)=p(1,0,0)$. Then, according to FIG. 16, in a case of $p(x_{n+1}, x_n, y_n)$, p(1,0,0) is 2/13. Therefore, a value substituted for $p(x_{n+1}, x_n, y_n)$ when n=1 is 2/13.

Herein, a method of deriving the equations (1) and (2) will be described. First, $h_1$ indicating an entropy value for a case in which $x_{n+1}$ occurs when $x_n$ and $y_n$ occur can be represented as in an equation (3). $p(x_{n+1}|x_n, y_n)$ in the equation (3) indicates a probability that $x_{n+1}$ occurs when $x_n$ and $y_n$ occur.

[Mathematical 3]

$$h_1 = -\sum_{x_{n+1}} p(x_{n+1}, x_n, y_n) \log_a p(x_{n+1} | x_n, y_n) \quad \text{Equation (3)}$$

Further, $h_2$ indicating an entropy value for a case in which $x_{n+1}$ occurs when $x_n$ occurs can be represented as in an equation (4). $p(x_{n+1}|x_n)$ in the equation (4) indicates a probability that $x_{n+1}$ occurs when $x_n$ occurs.

[Mathematical 4]

$$h_2 = -\sum_{x_{n+1}} p(x_{n+1}, x_n, y_n) \log_a p(x_{n+1} | x_n) \quad \text{Equation (4)}$$

The equation (3) subtracted from the equation (4) gives as in an equation (5).

[Mathematical 5]

$$h_2 - h_1 = -\sum_{x_{n+1}, x_n, y_n} p(x_{n+1}, x_n, y_n) \log_a p(x_{n+1} | x_n) +$$

$$\sum_{x_{n+1}, x_n, y_n} p(x_{n+1}, x_n, y_n) \log_a p(x_{n+1} | x_n, y_n) =$$

$$\sum_{x_{n+1}, x_n, y_n} p(x_{n+1}, x_n, y_n) \log_a \left( \frac{p(x_{n+1} | x_n, y_n)}{p(x_{n+1} | x_n)} \right)$$

Equation (5)

Since $h_2 - h_1$ represents an entropy value for a case in which $x_{n+1}$ occurs when $y_n$ occurs, $T_{J \to I}$ and $T_{I \to J}$ can be represented as in equations (6) and (7), in a case of swapping order of event occurrence.

[Mathematical 6]

$$T_{J \to I} = \sum_{x_{n+1}, x_n, y_n} p(x_{n+1}, x_n, y_n) \log \left( \frac{p(x_{n+1} | x_n, y_n)}{p(x_{n+1} | x_n)} \right) \quad \text{Equation (6)}$$

-continued

[Mathematical 7]

$$T_{I \to J} = \sum_{y_{n+1}, x_n, y_n} p(y_{n+1}, x_n, y_n) \log\left(\frac{p(y_{n+1} \mid x_n, y_n)}{p(y_{n+1} \mid y_n)}\right) \quad \text{Equation (7)}$$

Since $p(x_{n+1}|x_n,y_n)$ and $p(x_{n+1}|x_n)$ can be represented as in equations (8) and (9), the equations (6) and (7) can be represented as in the equations (1) and (2).

[Mathematical 8]

$$p(x_{n+1}|x_n,y_n) = p(x_{n+1},x_n,y_n)/p(x_n,y_n) \quad \text{Equation (8)}$$

[Mathematical 9]

$$p(x_{n+1}|x_n) = p(x_{n+1},x_n)/p(x_n) \quad \text{Equation (9)}$$

In this way, the causal relationship computation unit 13 can compute the above-described score, based on a probability that a first first-event-relevant state of a plurality of first-event-relevant states and a first second-event-relevant state of a plurality of second-event-relevant states concurrently appear.

Further, the causal relationship computation unit 13 can compute the above-described score, based on a probability that a first first-event-relevant state of a plurality of first-event-relevant states and a first second-event-relevant state of a plurality of second-event-relevant states concurrently appear and a second first-event-relevant state of the plurality of first-event-relevant states appears in an immediately subsequent image.

Further, the causal relationship computation unit 13 can compute the above-described score, based on a probability that a first first-event-relevant state of a plurality of first-event-relevant states appears.

Further, the causal relationship computation unit 13 can compute the above-described score, based on a probability that a second first-event-relevant state of a plurality of first-event-relevant states appears in an immediately subsequent image after a first first-event-relevant state of the plurality of first-event-relevant states appears.

Returning to FIG. 2, the output unit 14 outputs information indicating the first event and the second event for which the score satisfies a predetermined condition, from among the first events and the second events extracted from the time-series image group. The predetermined condition is that the score is a reference value or more.

The output unit 14 may output an image of a timing at which the first event and the second event for which the score satisfies a predetermined condition are occurring (a timing at which the event information (see FIG. 8) generated by the event information generation unit 12 indicates 3).

Further, the output unit 14 may output the score computed by the causal relationship computation unit 13 as well.

Further, when a plurality of pairs of the first event and the second event for which the score satisfies a predetermined condition are detected from among the time-series image group having been processed by the event extraction unit 11, the output unit 14 may output information indicating a pair having the highest score, or may output information indicating a plurality of pairs arranged in descending order of the score.

Figure 18:
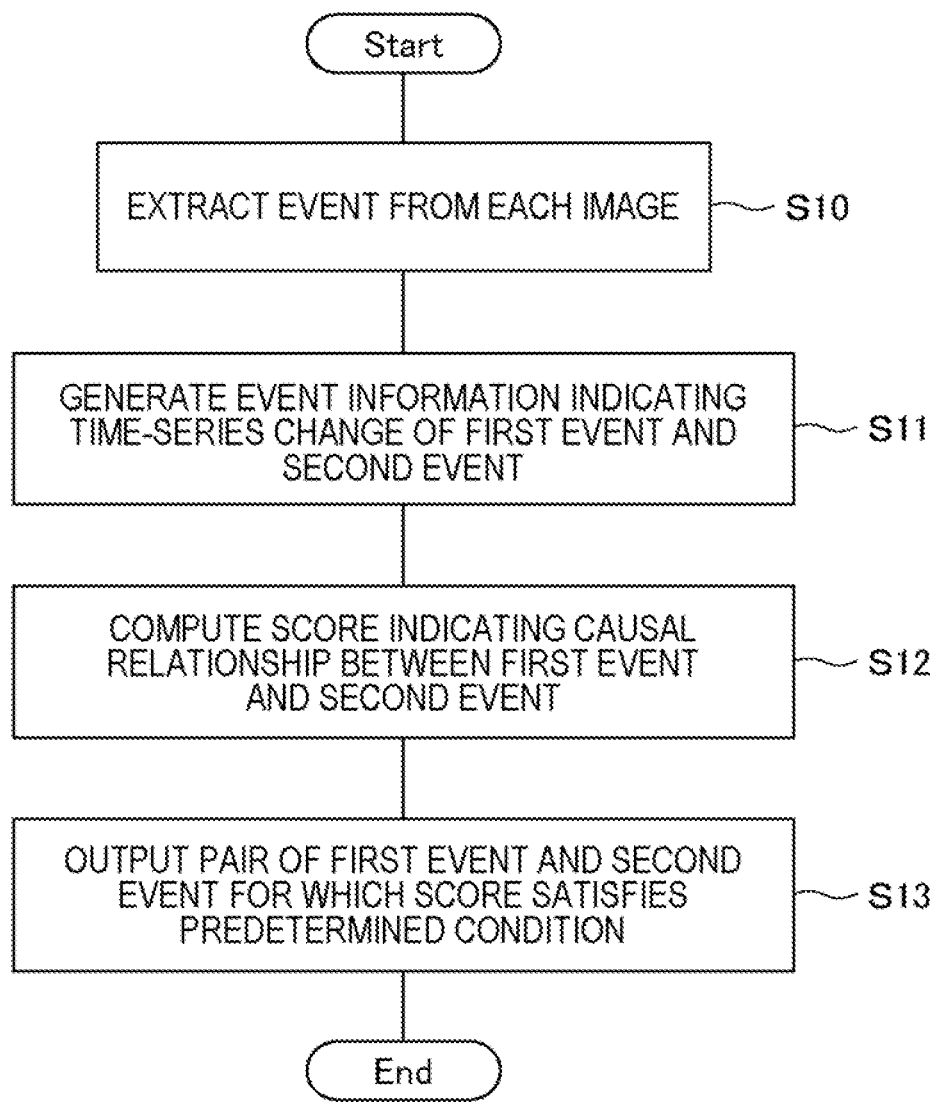
FIG. 18 is a flowchart illustrating one example of a flow of processing of the processing apparatus according to the present example embodiment.

Next, one example of a flow of processing of the processing apparatus 10 will be described by using a flowchart in FIG. 18.

In S10, the event extraction unit 11 extracts, for each image of a time-series image group including $q_1$ images generated by a first camera, an event in which a person and an object relate to each other. Further, the event extraction unit 11 extracts, for each image of a time-series image group including $q_2$ images generated by a second camera, an event in which a person and an object relate to each other.

In S11, the event information generation unit 12 determines a first event and a second event. Then, the event information generation unit 12 generates event information indicating a time-series change of the first event and a time-series change of the second event for a group of m images in the time-series image group generated by the first camera. Similarly, the event information generation unit 12 generates event information indicating a time-series change of the first event and a time-series change of the second event for a group of m images in the time-series image group generated by the second camera.

Then, the event information generation unit 12 generates event information (final version) indicating a time-series change of the first event, by time-synchronously integrating the event information indicating a time-series change of the first event for a group of m images in the time-series image group generated by the first camera with the event information indicating a time-series change of the first event for a group of m images in the time-series image group generated by the second camera.

Similarly, the event information generation unit 12 generates event information (final version) indicating a time-series change of the second event, by time-synchronously integrating the event information indicating a time-series change of the second event for a group of m images in the time-series image group generated by the first camera with the event information indicating a time-series change of the second event for a group of m images in the time-series image group generated by the second camera.

In S12, the causal relationship computation unit 13 computes, based on the event information generated in S11, a score indicating a causal relationship between the first event and the second event.

In S13, the output unit 14 outputs information indicating the first event and the second event for which the score computed in S12 satisfies a predetermined condition, from among the first events and the second events extracted in S11.

The processing apparatus 10 according to the present example embodiment described above can extract, from an image, a first event and a second event involved in an incident to be detected, and can compute a score indicating a causal relationship therebetween. The incident to be detected is, for example, "a man (adult) hands a bag (black) to a woman (adult)". The first event in this case is, for example, "a man (adult) carries a bag (black)", and the second event is, for example, "a woman (adult) carries a bag (black)".

Then, the processing apparatus 10 can output information indicating the first event and the second event for which the score satisfies a predetermined condition, that is, the first event and the second event being in a mutual causal relationship greater than a reference level, from among the first events and the second events extracted from a time-series image group.

According to the such processing apparatus 10, even when an object (a person or an object) involved in an incident to be detected is present within an image, whereas a scene in which the incident occurs (example: a scene of handing an object) is absent within the image, occurrence of the incident can be detected by means of an image analysis.

Second Example Embodiment

A processing apparatus 10 according to the present example embodiment is different from the first example embodiment in how a plurality of first-event-relevant states are defined and how a plurality of second-event-relevant states are defined. Other configurations of the processing apparatus 10 are similar to the first example embodiment.

Figure 19:
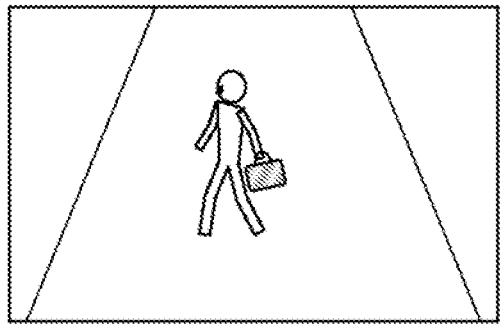
FIG. 19 is a diagram for illustrating one example of a plurality of first-event-relevant states.
Figure 19:
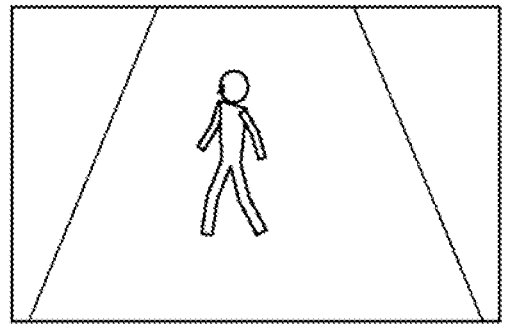
Figure 19:
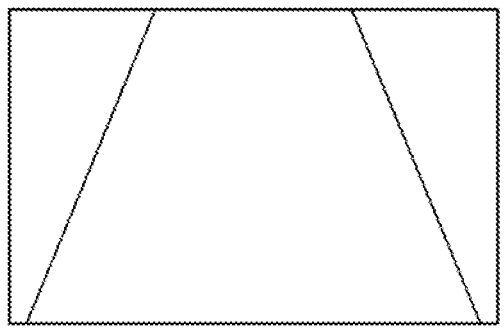
Figure 19:
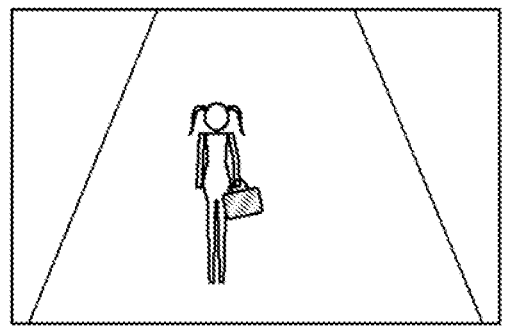

One example of how a plurality of first-event-relevant states are defined will be described by using FIG. 19. In an example illustrated in the drawing, four first-event-relevant states are defined.

A "first-event-relevant state: 3", a "first-event-relevant state: 1", and a "first-event-relevant state: 0" are similar to the first example embodiment. A "first-event-relevant state: 2" is a state in which a first person (man (adult)) is not included in an image, whereas a first object (bag (black)) and a first relationship (carry) are included in the image. In other words, the "first-event-relevant state: 2" is a state in which a first event defined by S1, V1, and O1 is not occurring, and the first person involved in the first event is absent in an image, whereas the first object involved in the first event is present in the image.

Figure 20:
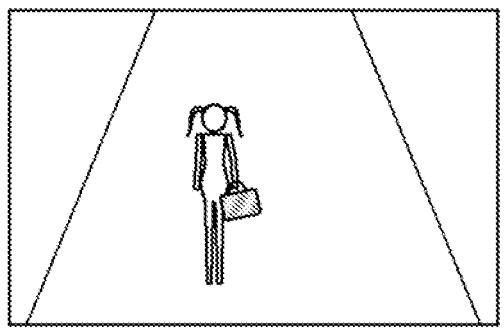
FIG. 20 is a diagram for illustrating one example of a plurality of second-event-relevant states.
Figure 20:
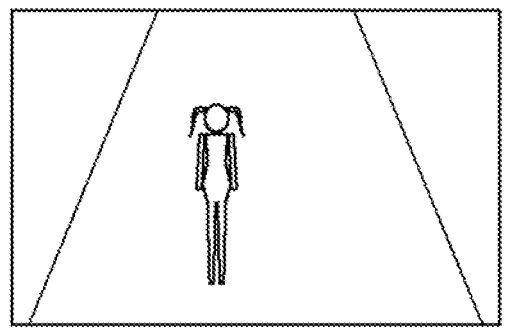
Figure 20:
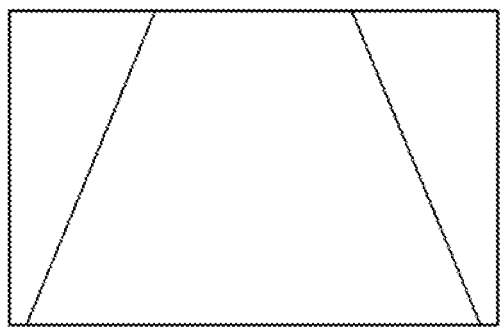
Figure 20:
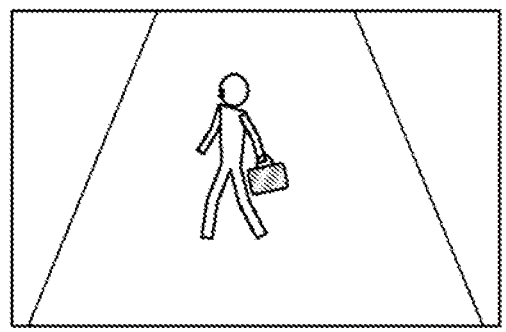

One example of how a plurality of second-event-relevant states are defined will be described by using FIG. 20. In an example illustrated in the drawing, four second-event-relevant states are defined.

A "second-event-relevant state: 3", a "second-event-relevant state: 1", and a "second-event-relevant state: 0" are similar to the first example embodiment. A "second-event-relevant state: 2" is a state in which a second person (woman (adult)) is not included in an image, whereas a second object (bag (black)) and a second relationship (carry) are included in the image. In other words, the "second-event-relevant state: 2" is a state in which a second event defined by S2, V2, and O2 is not occurring, and the second person involved in the second event is absent in an image, whereas the second object involved in the second event is present in the image.

The processing apparatus 10 according to the present example embodiment can achieve an advantageous effect similar to the processing apparatus 10 according to the first example embodiment.

The whole or part of the above-described example embodiments can be described as, but not limited to, the following supplementary notes.

1. A processing apparatus including:
an event extraction means for extracting, for each image of a time-series image group, an event in which a person and an object relate to each other;
an event information generation means for generating event information indicating a time-series change of a first event defined by a first person, a first object, and a first relationship between a person and an object and also indicating a time-series change of a second event defined by a second person, a second object, and a second relationship between a person and an object;
a causal relationship computation means for computing, based on the event information, a score indicating a causal relationship between the first event and the second event; and
an output means for outputting information indicating the first event and the second event for which the score satisfies a predetermined condition, from among the first events and the second events extracted from the time-series image group.

2. The processing apparatus according to supplementary note 1, wherein
the event information generation means determines the first event for which the first person, the first object, and the first relationship are specified, and also determines the second event for which the second person, the second object, and the second relationship are specified, based on a specified retrieval condition.

3. The processing apparatus according to supplementary note 1 or 2, wherein
the event information generation means
classifies each image into any of a plurality of first-event-relevant states in response to whether each of the first person, the first object, and the first relationship is included in an image, and generates the event information indicating a time-series change of the first-event-relevant state, and
classifies each image into any of a plurality of second-event-relevant states in response to whether each of the second person, the second object, and the second relationship is included in an image, and generates the event information indicating a time-series change of the second-event-relevant state.

4. The processing apparatus according to supplementary note 3, wherein
the causal relationship computation means computes the score, based on a probability that a first first-event-relevant state of a plurality of the first-event-relevant states and a first second-event-relevant state of a plurality of the second-event-relevant states concurrently appear.

5. The processing apparatus according to supplementary note 3 or 4, wherein
the causal relationship computation means computes the score, based on a probability that a first first-event-relevant state of a plurality of the first-event-relevant states and a first second-event-relevant state of a plurality of the second-event-relevant states concurrently appear and a second first-event-relevant state of a plurality of the first-event-relevant states appears in an immediately subsequent image.

6. The processing apparatus according to any of supplementary notes 3 to 5, wherein
the causal relationship computation means computes the score, based on a probability that a first first-event-relevant state of a plurality of the first-event-relevant states appears.

7. The processing apparatus according to any of supplementary notes 3 to 6, wherein
the causal relationship computation means computes the score, based on a probability that a second first-event-relevant state of a plurality of the first-event-relevant states appears in an immediately subsequent image after a first first-event-relevant state of a plurality of the first-event-relevant states appears.

8. A processing method executed by a computer, the method including:
an event extraction step of extracting, for each image of a time-series image group, an event in which a person and an object relate to each other;
an event information generation step of generating event information indicating a time-series change of a first event defined by a first person, a first object, and a first relationship between a person and an object and also indicating a time-series change of a second event defined by a second person, a second object, and a second relationship between a person and an object;

a causal relationship computation step of computing, based on the event information, a score indicating a causal relationship between the first event and the second event; and an output step of outputting information indicating the first event and the second event for which the score satisfies a predetermined condition, from among the first events and the second events extracted from the time-series image group.

9. A program causing a computer to function as:

an event extraction means for extracting, for each image of a time-series image group, an event in which a person and an object relate to each other;

an event information generation means for generating event information indicating a time-series change of a first event defined by a first person, a first object, and a first relationship between a person and an object and also indicating a time-series change of a second event defined by a second person, a second object, and a second relationship between a person and an object;

a causal relationship computation means for computing, based on the event information, a score indicating a causal relationship between the first event and the second event; and an output means for outputting information indicating the first event and the second event for which the score satisfies a predetermined condition, from among the first events and the second events extracted from the time-series image group.

While the present invention has been described with reference to the example embodiments (and the examples), the present invention is not limited to the above-described example embodiments (and the examples). Various modifications that can be understood by those skilled in the art can be made to the configurations and details of the present invention within the scope of the present invention.

What is claimed is:

1. A processing apparatus comprising:
   at least one memory configured to store one or more instructions; and
   at least one processor configured to execute the one or more instructions to:
   extract, for each image of a time-series image group, an event in which a person and an object relate to each other;
   generate event information indicating a time-series change of a first event defined by a first person, a first object, and a first relationship between a person and an object and also indicating a time-series change of a second event defined by a second person, a second object, and a second relationship between a person and an object;
   compute, based on the event information, a score indicating a causal relationship between the first event and the second event; and
   output information indicating the first event and the second event for which the score satisfies a predetermined condition, from among the first events and the second events extracted from the time-series image group.

2. The processing apparatus according to claim 1, wherein the processor is further configured to execute the one or more instructions to determine the first event for which the first person, the first object, and the first relationship are specified, and also determine the second event for which the second person, the second object, and the second relationship are specified, based on a specified retrieval condition.

3. The processing apparatus according to claim 1, wherein the processor is further configured to execute the one or more instructions to:
   classify each image into any of a plurality of first-event-relevant states in response to whether each of the first person, the first object, and the first relationship is included in an image, and generate the event information indicating a time-series change of the first-event-relevant state, and
   classify each image into any of a plurality of second-event-relevant states in response to whether each of the second person, the second object, and the second relationship is included in an image, and generate the event information indicating a time-series change of the second-event-relevant state.

4. The processing apparatus according to claim 3, wherein the processor is further configured to execute the one or more instructions to compute the score, based on a probability that a first first-event-relevant state of a plurality of the first-event-relevant states and a first second-event-relevant state of a plurality of the second-event-relevant states concurrently appear.

5. The processing apparatus according to claim 3, wherein the processor is further configured to execute the one or more instructions to compute the score, based on a probability that a first first-event-relevant state of a plurality of the first-event-relevant states and a first second-event-relevant state of a plurality of the second-event-relevant states concurrently appear and a second first-event-relevant state of a plurality of the first-event-relevant states appears in an immediately subsequent image.

6. The processing apparatus according to claim 3, wherein the processor is further configured to execute the one or more instructions to compute the score, based on a probability that a first first-event-relevant state of a plurality of the first-event-relevant states appears.

7. The processing apparatus according to claim 3, wherein the processor is further configured to execute the one or more instructions to compute the score, based on a probability that a second first-event-relevant state of a plurality of the first-event-relevant states appears in an immediately subsequent image after a first first-event-relevant state of a plurality of the first-event-relevant states appears.

8. A processing method executed by a computer, the method comprising:
   extracting, for each image of a time-series image group, an event in which a person and an object relate to each other;
   generating event information indicating a time-series change of a first event defined by a first person, a first object, and a first relationship between a person and an object and also indicating a time-series change of a second event defined by a second person, a second object, and a second relationship between a person and an object;
   a computing, based on the event information, a score indicating a causal relationship between the first event and the second event; and
   outputting information indicating the first event and the second event for which the score satisfies a predetermined condition, from among the first events and the second events extracted from the time-series image group.

9. A non-transitory storage medium storing a program causing a computer to:
- extract, for each image of a time-series image group, an event in which a person and an object relate to each other;
- generate event information indicating a time-series change of a first event defined by a first person, a first object, and a first relationship between a person and an object and also indicating a time-series change of a second event defined by a second person, a second object, and a second relationship between a person and an object;
- compute, based on the event information, a score indicating a causal relationship between the first event and the second event; and
- output information indicating the first event and the second event for which the score satisfies a predetermined condition, from among the first events and the second events extracted from the time-series image group.

* * * * *